United States Patent
Tasker et al.

(10) Patent No.: US 6,625,256 B1
(45) Date of Patent: Sep. 23, 2003

(54) FAILOVER MECHANISMS FOR REMOTE NETWORKED PHONES

(75) Inventors: Michael Edric Tasker, Pleasanton, CA (US); Vikas Butaney, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/844,872

(22) Filed: Apr. 27, 2001

(51) Int. Cl.[7] .................................................. H04M 3/22
(52) U.S. Cl. ................ 379/32.04; 379/1.01; 379/15.01; 379/16
(58) Field of Search .................... 379/15.01, 16, 379/1.01, 265.09, 221.03, 9.05, 15.02, 17, 32.04, 164, 165, 196, 198, 229, 231, 234, 268, 272, 279

(56) References Cited

U.S. PATENT DOCUMENTS

| | | | | |
|---|---|---|---|---|
| 5,515,418 A | * | 5/1996 | Yamaguchi et al. | 370/216 |
| 5,757,904 A | * | 5/1998 | Anderson | 345/708 |
| 5,832,222 A | * | 11/1998 | Dziadosz et al. | 709/216 |
| 6,005,920 A | * | 12/1999 | Fuller et al. | 379/15.01 |
| 6,434,700 B1 | * | 8/2002 | Alonso et al. | 713/169 |

* cited by examiner

Primary Examiner—Duc Nguyen
Assistant Examiner—Barry W Taylor
(74) Attorney, Agent, or Firm—Marger Johnson & McCollom, PC (57) ABSTRACT

A method of providing failover service to network phones. A failure of communication between a network phone and a primary call manager is identified. Communication is established with a default network device and phone configuration information is provided to the default network device. The network phones needing failover service then use the directory constructed at the default network device as a failover call manager.

25 Claims, 3 Drawing Sheets

FAILOVER MECHANISMS FOR REMOTE NETWORKED PHONES

BACKGROUND

1. Field

This disclosure relates to networked phones, more particularly to mechanisms to provide support for remote networked phones after an external link failure.

2. Background

The use of data networks to handle telephone traffic offers several advantages to businesses. This use allows the businesses to use excess capacity in their data network infrastructure for voice traffic, often avoiding toll charges associated with Public Switched Telephone Networks (PSTN) and making the data network more efficient. The 'telephones' used in these data networks may be something similar to a traditional telephone, with a base and a receiver, or the combination of a computer with a microphone and speakers.

These telephones, regardless of their configurations, use data networks to communicate. The data network may conform to Internet Protocol (IP), Asynchronous Transfer Mode (ATM), Frame Relay (FR), or other data network protocol. Some may also use a combination, such as IP over FR, or 1P over ATM. This often occurs when a local node on the network is connected to the network with a Wide Area Network (WAN) link. The WAN link may be ATM or FR, while the phones use IP to communicate. For this reason, these telephones will be referred to as network phones here.

Management of the network telephone system is often done separately from the data network itself. Network telephones have somewhat different requirements that other devices on the network. For example, the telephones must have telephone numbers in addition to network addresses. They must have a way to connect to the PSTN to reach phones not on the network, as another example. In some circumstances, a call manager or handler is used to manage the network phone system.

Many of existing call manager products can handle thousands of network phones. These phones may be distributed across the country, in groups of variable sizes. For example, a company may have a large headquarters on the West Coast with thousands of phones and have research and sales offices scattered to the East Coast each with only a few phones each. The call manager at one location, such as the headquarters, may support all of these phones.

The network phones at the locations remote to the call manager may suffer loss of service if the link between the call manager and the remote location fails. The network phones generally rely upon the WAN link to make calls external to their local site. The system should provide some sort of failover mechanism in this circumstance.

One solution is to place a secondary, stand-by call manager in the remote location. However, the cost of the secondary call manager would be unacceptable, especially if there were only two or three phones at the remote location. Additionally, the system would have to synchronize between the primary and secondary call managers. The amount of data bandwidth required to do this would generally be too large to operate successfully over a typical 64K–28K bits per second remote WAN link.

An alternative approach would be to manually configure the data required by the standby call manager for the small number of network phones located at each branch office. This is not a desirable solution for organizations having several small branch office controlled by a single call manager. The administrator would have to configure and manage several hundred call managers, a prohibitive amount of work.

Therefore, it would seem useful to have an automatic mechanism to distribute only the minimum configuration information required by devices located in each branch office, requiring only low bandwidth.

SUMMARY

One aspect of the disclosure is a method of providing failover service for network phones upon failure of their primary call manager. When a communication link between the network phone and the primary call manager fails, the network phone contacts a default network device and requests failover service. The phone then provides its directory information to the network device. The network device constructs a directory. The network phone then uses the constructed directory for failover service until the link between the phone and the primary call manager can be reestablished. Upon reestablishment of the connection, the network device continues to provide the failover service until only a predetermined number of phones with active calls remain. The network device then sends a message to phones with active calls and requests termination of the calls and migration back to the primary call manager.

Another aspect of the disclosure is a method of providing failover service for network phones. A network device capable of providing failover service receives a failover request from at least one network phone. The network device accesses information resident on each phone and uses that information to build a directory of all the phones relying upon it for failover service. This directory is then used to provide connection and routing for these phones.

BRIEF DESCRIPTION OF THE DRAWINGS

The invention may be best understood by reading the disclosure with reference to the drawings, wherein.

DETAILED DESCRIPTION OF THE EMBODIMENTS

Providing failover service for network phones will typically have two parts. The first part is how to provide the phones with a failover device that they can contact when they lose the link to the primary call manager application. The second part is how to provide the network phones with the information they need to function on the network. The discussion above pointed out some undesirable options, including providing a call manager at each branch office and requiring synchronization with the primary call manager, or manually configuring a secondary call manager at each branch office.

Additionally, it is undesirable to require the primary call manager to be responsible for directly providing the failover configuration data to a large number of network devices providing failover service. It is also undesirable for the call manager to have an explicit configuration indicating the network address of the devices providing failover service for each network phone. If it did, every time a network phone was moved, the central call manager would have to be updated. However, application of this invention can solve these problems in addition to others.

In order for network phones to operate, they must know the route used for packets with a destination not part of the local network. The phone may not actually have this information. This is especially true in dynamic network environments where the best route may change depending upon traffic conditions and network link outages. However, the phone will typically know the network address of a network device that does have the routing information.

Figure 1:
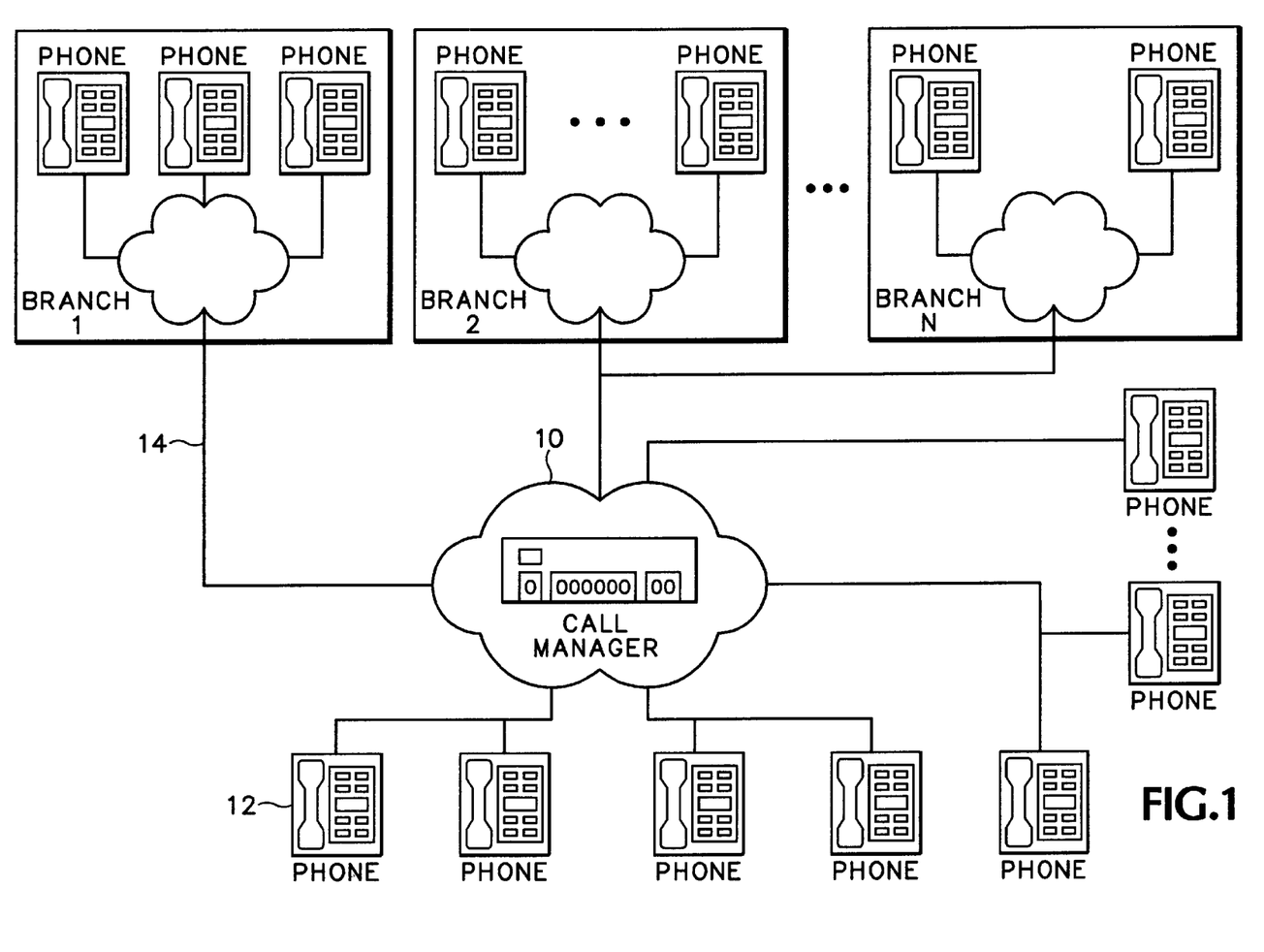
FIG. 1 shows one example of a network environment in which failover service may be deployed, in accordance with the invention.

Turning now to FIG. 1, a network phone system having a centralized, primary call manager is shown. The call manager 10 may be any network call management application, such as Cisco's Call Manager™. The term call manager, however, is not intended to be limited to that particular product, but is instead used generally to refer to any network phone call management application. Typically, the call manager 10 will be located at the headquarters location of the enterprise. The call manager may have several thousand individual phones at the headquarters such as 12 as well as a like amount of phones scattered in branch offices around the country or the world.

There is no theoretical limit on the number of branch offices and phones supported by one call manager application. However, physical limitations, such as the number of phones a call manager can support, may apply. In FIG. 1, the call manager 10 supports from 1 to N branch offices, where N is left up to the system designer and any limitations that may apply in a particular implementation. Each branch office may have from a few network phones to thousands. For example, branch 1 has three phones. Branch 2 has a larger number of phones, and Branch N only has two. The provision of failover service to these branch offices is necessary upon failure of the WAN or other link between the call manager and the branch offices.

Figure 2:
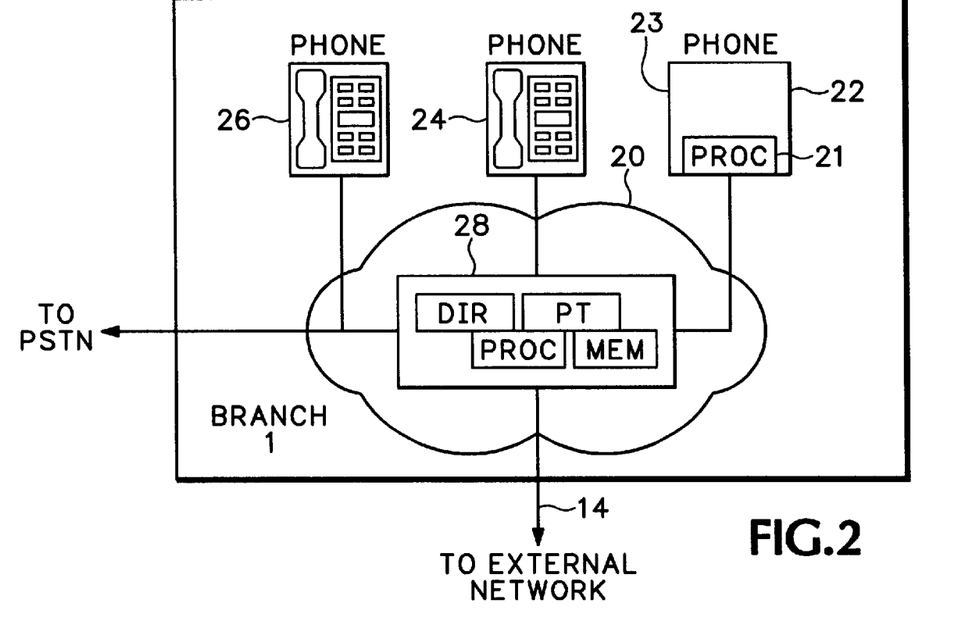
FIG. 2 shows one example of a branch office having failover service, in accordance with the invention.

Referring to FIG. 2, assume that branch 1 has lost its link 14 to the primary call manager of FIG. 1. The local network of branch 1 has the three phones 22, 24 and 25 connected to it. In addition, at least one default network device 28 resides on the local network as well. For purposes of this discussion, a local network is that which allows all of the devices connected to it to communicate without relying upon any external link. In one embodiment of the invention, the network device 28 is a router.

In this example, each of the phones 22, 24 and 26 have a network address and a port that identifies their link to the primary call manager. They reach the call manager through a default network device 28. During normal operation, a message exchange is typically occurring between the call manager and the phones it is managing. Even in idle times, the phone will typically notify the call manager of its existence and continued presence with a 'keep alive' message. A 'keep alive' message is a periodic message sent to the call manager that notifies the call manager that the phone is still active. Typically, there is a confirmation or acknowledgement from the call manager. This allows the call manager to keep its list of phones current and eliminate phones that are no longer active without an explicit instruction to do so. These messages are sent between the call manager and the phone using the default network device.

When the link 14 between the primary call manager and the network phones in branch office 1 fail, the message traffic occurring during idle times will stop. This notifies the phone that it has lost its contact with the call manager. Typically the phone will have a list of instructions to execute during this condition. Other events may cause the messages to cease, such as failure of the call manager. The phone executes its instructions to reestablish call manager access. For example, it may have an instruction to access a secondary call manager at the central site. These types of instructions are covered in the prior art and are only mentioned here for completeness.

Once the phone has completed the instructions related to reestablishing contact at the main site and determined that there is no contact with the main site, it will request failover service. During this condition, the default network device will act as a failover service provider. Failover service allows the network phones to still communicate with other phones on the local network, as well as allowing them to reach the PSTN. The phones will locate the default network device through the same network address and/or port as were associated with the primary call manager link.

In one embodiment, the phone knows the network address and port number to talk to the primary call manager. It only knows a network address of the default network device. When failover service is needed, the phone combines the port number associated with the primary call manager with the network address of the default network device.

Each device on a network usually has a single address, but the device may support multiple unrelated services. Each service is typically associated with a connection port on the device. As the device receives messages, it determines what type of service response to offer for the specific message received on that port. This also allows the device to easily screen out requests that it does not support or want to service. It can simply ignore messages received on certain ports.

The network phone receives its network address through some sort of protocol that assigns its address from the available addresses. In most applications, the phone will be given the network address for the network device that provides connection to the primary call manager, which will be referred to as its default network device. For example, on IP (Internet Protocol) networks, an address assignment application called Dynamic Host Configurable A Protocol (DHCP) assigns network addresses to devices on the network, including the phones and the network devices.

Examples in the IP network environment will be used throughout this discussion for ease of understanding the invention with widely used terminology and conventions. There is no intention to limit the scope of the invention to IP networks. The mechanisms and processes discussed herein are equally applicable to other types of networks, and any IP-specific function used will have analogous functions in other types of networks.

Application of this invention causes the network phone to assume that its default network device is the same network device providing it with failover service. For example, in an IP environment, the network phone assumes that the TCP port number used in association with the IP address to contact the failover network device is the same port number that it uses to communicate with the primary call manager. In this manner, the network phone is able to locate its failover network device.

Once the network phone has located its failover network device, the phone must have access to information similar to that typically provided by the call manager. This information, such as phone numbers associated with network addresses, and names associated with the phone numbers, will be lost if the link 14 fails between the branch office and the call manager. Application of this invention causes the phone to record this information and well as other information during normal operation. For example, phone 22 may have a user name "John Jones" and a phone number of "408-555-1234." The phone and the call manager know this information. The phone stores this information in the non-volatile memory located in the a phone.

Any one of the phones of any configuration can provide this information to the default network device. As can be seen in FIG. 2, phone 22 is shown in more detail. It typically comprises a port 21 operable to provide communication between the phone and its network and a processor that is operable to request failover service, provide the phone configuration information to the default network device and use the director as a failover call manager. Similarly, the default network device includes at least one port providing communication links between the network phones assigned to it, a processor for providing failover service and a memory in which a directory can be built from the information accessed from the phones.

Other information may be stored as well. This information may include, but is not limited to, speed dial keys and the numbers associated with them. Additional information may include name directories associated with speed-dial keys, etc. This other information, as well as the phone numbers, network addresses and user names will be referred to as phone configuration information.

When the phone contacts the default network device for failover service, this stored phone configuration information is made available to the network device. The network device can then build a directory of the network phones, their network addresses, phone numbers and user names to route incoming calls to the appropriate phone. In addition, this will also allow calls within a local network to be routed. The phone act as a distributed memory of directory information, keeping the network device available for other purposes until failover service is needed. Once the failover service is needed, phones contacting the network device then provide it with the information it needs and the failover directory is built.

In the case of a large branch office, the phones may be divided up between several default network devices. In that case, for example, the default network device for the phones in group A may not know of the existence of the default network device for the phones in group B. This would normally prevent the phones in group A from connecting to the phones in group B, but several prior art techniques exist to handle that circumstance, such as use of gatekeepers. This invention is not limited to situations where only one default network device can be used. Providing failover service in the manner set forth by the invention is compatible with several different approaches to handle different circumstances.

Figure 3:
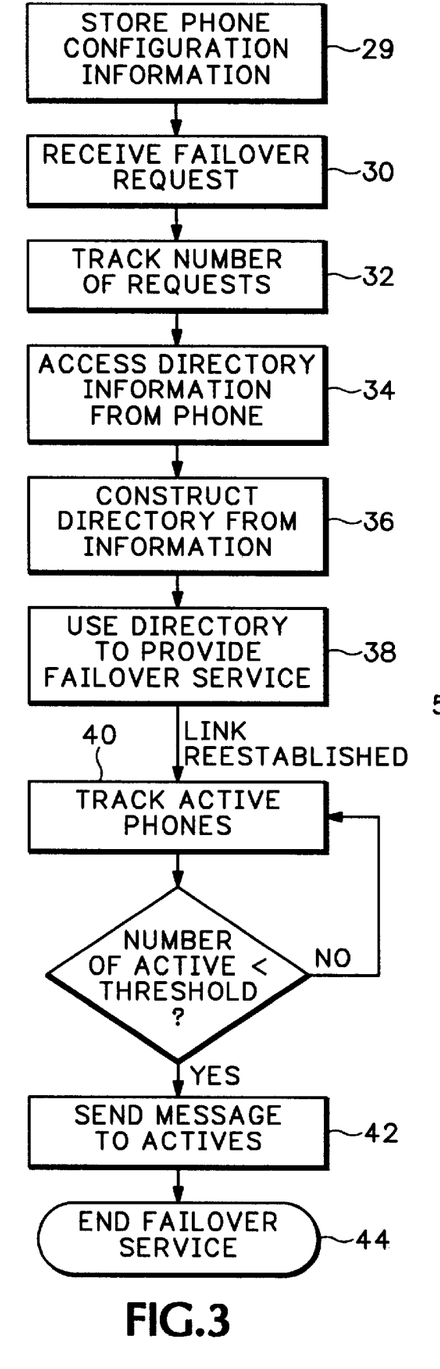
FIG. 3 shows one embodiment of a method of providing failover service, in accordance with the invention.

The overall process for providing failover service is shown in FIG. 3. Prior to failure of the communications link between the phone and the call manager, the phone configuration information is stored in the phone at 29. The default router is contacted at 30 with a request from a phone for failover service. The router requires no preliminary configuration information prior to being contacted by the network phone. Tracking the number of requests for failover service is an optional step, which will be discussed in more detail later. At 34, the router accesses the directory information stored in the phone. This can be done by query, or the phone could just send it to the router. Regardless of the manner in which the directory information is collected, the router has access to it. Using the directory information from each phone requesting failover service, a directory is constructed at 36. This directory allows the default router to provide failover service at 38.

As mentioned previously, an optional part of this process is to track the number of requests for failover service, such as that shown at 32. It must be noted that while this is shown occurring after the reception of a failover request, it may actually occur at any point in the process prior to the reestablishment of the link. Once the link is reestablished, the migration of phones using the failover call manager on the default network device back to the primary call manager can be handled in many ways. The method of migration does not necessarily rely upon the method of providing failover service, nor does the method of failover service require any particular method to handle the migration.

However, in one embodiment, the migration is handled as shown in the lower half of FIG. 3 after the link is reestablished. At 40, the number of active phones is tracked. An active phone is one with a current call that is using the failover call manager. When the number of active phones on the failover call manager falls below some threshold, as determined at 42, the default network device sends a message to the active phones. The message requests that they terminate the call and switch back to the primary call manager.

The threshold used to determine at what point messages are sent is left largely up to the system designer. In this particular embodiment, the threshold is based upon the number of active phones as a percentage of the maximum number of failover requests received at 32. When the number of active phones falls below this percentage of maximum number of phones, the message is sent at 44. In one embodiment, the percentage was set at half. Once the active phones have terminated their current calls, the failover service ends. This frees up the network device to return to its normal duties.

Figure 4:
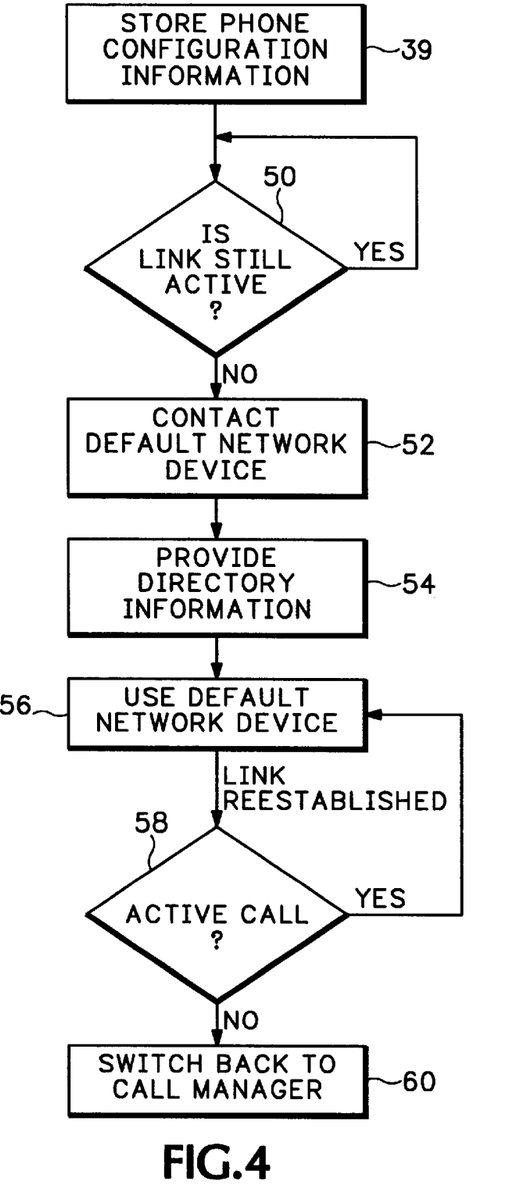
FIG. 4 shows one embodiment of a method of acquiring failover service, in accordance with the invention.

Having seen one embodiment of a method to provide failover service, it may be useful to look at an embodiment of a method of acquiring failover service from the phone side. An embodiment of this is shown in FIG. 4. Prior to failure of the communications link between the phone and the call manager, the phone configuration information is stored in the phone at 49. At 50, the phone determines if the link between it and the primary call manager is still active. If the link fails, the phone then contacts the default router with a failover request at 52. As mentioned before, the phone may have instructions to perform several other tasks first and upon their failure will contact the router, but that is outside the scope of this disclosure.

Once the failover request is sent to the default network device at 52, the phone. configuration information is provided at 54. As mentioned before, the phone may offer this to the default network device or the device may query the phone for it, as examples. At 56, the phone uses the default network device as the failover call manager.

As discussed with regard to FIG. 3, the process may or may not include methods to migrate calls from the failover call manager to the primary call manager after the link is reestablished. These may be independent of each other. However, in one embodiment of the invention the phone may determine whether it is involved in an active call at 58, once the link has been reestablished. If it is, it will continue to use the failover call manager until the call ends, or the phone decides to terminate the call. It may decide to terminate the call in response to a message from the failover call manager as mentioned in FIG. 3. Once there is no longer an active call at 58, the phone switches back to the primary call manager at 60.

Implementation of this invention can be performed in several ways. A network phone, such as 22 shown in FIG. 2, requires a port allowing communication with the default network device 28, also shown in FIG. 2, and a processor operable to request failover service, provide directory information to the default network device and use the default network device as a failover call manager.

It is likely that this invention could be implemented as a software upgrade in network phones and network devices. The upgrade will more than likely contain the necessary instructions for either the phone or the network device to cause them to perform the steps of the invention. The software will typically be contained on some article, such as a diskette or CD-ROM, and contain the instructions that, when executed, cause the machine to perform the methods of the invention.

In this manner, failover service is provided to network phones with no extra requirements being placed on the default network device at any time other than the duration of failover service. The phones can be moved around without any reconfiguration of either the default network device or the primary call manager. More importantly, the network phones are still usable during a link failure between the branch office and the central site.

Thus, although there has been described to this point a particular embodiment for a method and apparatus for failover service for networked phones, it is not intended that such specific references be considered as limitations upon the scope of this invention except in-so-far as set forth in the following claims.

What is claimed is:

1. A method of acquiring failover service for network phones, the method comprising:
   storing phone configuration information in the network phones;
   identifying a failure of communication between a network phone and a primary call manager;
   establishing communication with a default router;
   providing phone configuration information to the default router from the network phones; and
   using the default router as a failover call manager until communication with a primary call manager can be established.

2. The method of claim 1, wherein establishing communication with a default router is accomplished using a network address in combination with a port previously associated with the primary call manager.

3. The method of claim 1, wherein establishing communication with a default router is accomplished using a port previously associated with the primary call manager.

4. The method of claim 1, wherein phone configuration information includes network address, phone number and user name for the network phone.

5. The method of claim 1, wherein the method further comprises:
   a) determining if an active call is in progress; and
   b) switching back to the primary call manager when there is no active call.

6. A network phone, comprising:
   a memory to store phone configuration information;
   a port operable to allow communication between the network phone and a default router; and
   a processor configured to:
      request failover service from the default router;
      provide phone configuration information to the default router; and
      use a directory on the default router as a failover call manager.

7. The network phone of claim 6, wherein the network phone further comprises a telephone hand set and base connectable to a network.

8. An article containing machine-readable code that, when executed, causes the machine to:
   store phone configuration information;
   identify a failure of communication between a network phone and a primary call manager;
   establish communication with a default router;
   provide phone configuration information to the default router from the network phones; and
   use the default router as a failover call manager until communication with a primary call manager can be established.

9. The article of claim 8, wherein the article further contains machine-readable code that, when executed, causes the machine to:
   a) determine if an active call is in progress; and
   b) switch back to the primary call manager when there is no active call.

10. A network phone, comprising:
    a means for storing phone configuration information;
    a means for allowing communication between the network phone and a default router; and
    a processing means operable to:
       request failover service from the default router;
       provide the phone configuration information to the default router from the network phones; and
       use a directory on the default router as a failover call manager.

11. The network phone of claim 10, wherein the means for allowing communication further comprises a port on a data network.

12. The network phone of claim 10, wherein the processing means further comprises a system processor.

13. The router of claim 10, wherein the processing means further comprises a controller.

14. A method of providing failover service for network phones, the method comprising:
    receiving a failover request from a network phone;
    accessing phone configuration information previously stored in the network phone;
    constructing a directory using the phone configuration information; and
    providing failover service using the directory.

15. The method of claim 14 wherein the phone configuration information accessed includes a phone number for the network phone.

16. The method of claim 14 wherein the phone configuration information accessed includes a user name for the network phone.

17. The method of claim 14, wherein providing failover service further comprises directing incoming calls to appropriate network phones based upon information in the directory.

18. The method of claim 14 wherein the method further comprises:

a) tracking a maximum number of failover requests;

b) tracking a number of active phones after communication with a primary call manager is reestablished;

c) determining if the number of active phones falls below a predetermined threshold;

d) sending a message to any active phones requesting termination of current calls and switching to the primary call manager, if the number of active phones is below the predetermined threshold; and e) ending failover service when all active calls have terminated.

19. The method of claim 18, wherein the threshold is a predetermined percentage of the maximum number of failover requests.

20. A router, comprising:

at least one port operable to allow communication between the router and its assigned network phones;

a processor, operable to:
  receive failover requests from the assigned phones;
  access phone configuration information previously stored in the assigned phones;
  construct a directory from the phone configuration information; and
  provide failover call manager service using the directory; and a memory in which the directory is constructed.

21. The router of claim 20, wherein the assigned phones are those phones that have the router as their default router.

22. An article containing machine-readable code that, when executed, causes the machine to:

receive a failover request from a network phone;

access phone configuration information previously stored in the network phone;

construct a directory using the phone configuration information; and provide failover service using the directory.

23. The article of claim 22, wherein the article further contains machine-readable code that, when executed, causes the machine to:

a) track a maximum number of failover requests;

b) track a number of active phones alter communication with a primary call manager is reestablished;

c) determine if the number of active phones falls below a predetermined threshold;

d) send a message to any active phones requesting termination of current calls and switching to the primary call manager, if the number of active phones is below the predetermined threshold; and e) end failover service when all active calls have terminated.

24. A router, comprising:

means for allowing communication between the router and its assigned network phones;

a processing means, operable to:
  receive failover requests from the assigned phones;
  access phone configuration information previously stored in the assigned phones;
  construct a directory from the phone configuration information; and
  provide failover call manager service using the directory; and means for storing the directory.

25. The router of claim 24, wherein the assigned phones are those phones that have the router as their default router.

\* \* \* \* \*

UNITED STATES PATENT AND TRADEMARK OFFICE
CERTIFICATE OF CORRECTION

PATENT NO. : 6,625,256 B1
DATED : September 23, 2003
INVENTOR(S) : Tasker et al.

It is certified that error appears in the above-identified patent and that said Letters Patent is hereby corrected as shown below:

Column 1,
Line 27, "FR, or1P over" should read -- Fr, or IP over --.
Line 63, "typical 64K-28K bits" should read -- typical 64K-128K bits --.

Column 3,
Line 43, "phones 22, 24 and 25 connected" should read -- phones 22, 24 and 26 connected --.

Column 4,
Line 44, "Configurable A Protocol" should read -- Configurable Protocol --.

Column 5,
Line 17, "the director as" should read -- the directory as --.
Line 37, "The phone act " should read -- The phones act --.

Column 6,
Line 6, "38. ¶ As" should read --38. ¶ In one embodiment of the invention, the phone configuration information stored at the phone is substantially the same information used to provide displayed numbers on the phone. For example, assume phone has a more traditional `phone' look, with speed dial keys and associated LCD displays next to each key. This information, as well as the network address and phone number of that phone, is what are provided to the default network device as phone configuration information. In this manner, no new information needs to be stored at the phone. All that is needed is a way for the information to be made available to the default network device. ¶ As --.

Column 6,
Line 54, "phone. configuration" should read -- phone configuration --.

UNITED STATES PATENT AND TRADEMARK OFFICE
CERTIFICATE OF CORRECTION

PATENT NO. : 6,625,256 B1
DATED : September 23, 2003
INVENTOR(S) : Tasker et al.

It is certified that error appears in the above-identified patent and that said Letters Patent is hereby corrected as shown below:

Column 10,
Line 8, "phones alter communication" should read-- phones after communication --.

Signed and Sealed this

Sixth Day of July, 2004

JON W. DUDAS
*Acting Director of the United States Patent and Trademark Office*